United States Patent
Coppo

(10) Patent No.: US 6,302,489 B1
(45) Date of Patent: Oct. 16, 2001

(54) RETRACTOR

(75) Inventor: Fulvio Coppo, Turin (IT)

(73) Assignee: Congress Financial Corporation (Florida), Miami, FL (US)

( * ) Notice: Subject to any disclaimer, the term of this patent is extended or adjusted under 35 U.S.C. 154(b) by 0 days.

(21) Appl. No.: 09/403,236

(22) PCT Filed: Apr. 20, 1998

(86) PCT No.: PCT/GB98/01133

§ 371 Date: Oct. 18, 1999

§ 102(e) Date: Oct. 18, 1999

(87) PCT Pub. No.: WO98/49035

PCT Pub. Date: Nov. 5, 1998

(30) Foreign Application Priority Data

Apr. 29, 1997 (GB) .................................................. 9708748

(51) Int. Cl.[7] .................................................. B60R 22/46
(52) U.S. Cl. .......................................... 297/478; 297/480
(58) Field of Search .................................... 297/474, 475, 297/478, 476, 480, 378.1, 378.12, 378.11; 242/384

(56) References Cited

U.S. PATENT DOCUMENTS 4,610,480 * 9/1986 Yamada et al. .
5,495,994 * 3/1996 Rumpf et al. .

* cited by examiner

*Primary Examiner*—Milton Nelson, Jr.

(57) ABSTRACT

A retractor (20) for a vehicle safety restraint for use in a rear vehicle seat comprising: seat belt webbing wound on a rotatable spool (2), and a vehicle sensor having an inertial sensor mass (5) supported in a housing and movable relative thereto when vehicle acceleration or deceleration exceeds a predetermined magnitude; a vehicle sensor pawl (7) arranged to be moved, in response to movement of the mass, from a position in which the spool is freely rotatable into a spool locking position; a seat back latching condition detector, adapted to be located in a latch for the rear seat back, means (10) connecting the latching condition detector to the vehicle sensing pawl, the connecting means being operable to move the pawl (7) into the spool locking position when a seat back deatched condition is detected.

2 Claims, 5 Drawing Sheets

RETRACTOR

DESCRIPTION

The present invention relates to a retractor for a vehicle safety restraint seat belt and particularly to a retractor for use in the rear passenger seats of a vehicle and to a safety locking arrangement therefor.

Retractors for rear seat belts are often mounted on the seat back rest itself since space is at a premium in the rear passenger compartment. For the seat belt to be effective therefore the back rest must be fastened securely to a fixed part of the vehicle. Normally this would be the case. However in some vehicles, such-as so-called station-wagons or estate cars and so-called hatchback cars, the rear seat back rest can be unlatched from its fastened upright position and rotated into a horizontal position to increase the luggage capacity of the vehicle. in some models the back rest is split and one part may remain upright to accommodate a seated passenger while the other part is lowered to allow bulky luggage to overflow from the luggage compartment behind the seat back.

In both cases there is a danger that when the seat back rest is returned to the upright position it may not be securely locked. In a crash, the rear passenger will then not be safely restrained because the retractor, attached to the seat back, will move when the seat back moves under the inertial loading caused by the crash.

The rear seat retractor is constructed in a similar manner to a front seat retractor and has both a web sensor and a vehicle sensor. The web sensor locks the retractor against pay-out i, the belt webbing is suddenly jerked, as would happen if it were suddenly loaded by the inertia of the user in a crash. This is known technology. The vehicle sensor detects a sudden change of speed of the vehicle and locks the retractor, again in a manner known to those skilled in the art.

The vehicle sensor typically comprises an inertia sensitive ball resting freely in a cup. A sudden deceleration of the vehicle causes the ball to keep moving and to ride up the side of the cup. A pawl resting on the ball is thus deflected upwards and this pawl activates a locking mechanism to lock the retractor spool against rotation and thus against further pay-out of webbing. The geometry of the ball type vehicle sensor means that it will also be activated if the retractor is tilted. This is used in DE 29 27 159 and GB 2 249 339 as an inherent seat back tilt sensor. If the seat back is not upright then the vehicle sensor locks the retractor against pay-out and it cannot be used.

However this known arrangement will not detect a rear seat back which is in the upright position but is not locked securely into the upright position. In this situation the retractor of the known arrangement can be used to fasten a vehicle occupant who will be unaware that the retractor is free to move and thus that he is not safely restrained.

In GB 2 286 624 a sensor is located in the seat back latch itself. When this detects that the latch is securely fastened it releases an additional locking device on the retractor to allow the retractor to be used. This is an expensive system requiring an additional locking device to be fitted to the retractor.

The present invention aims to provide an improved safety locking arrangement for a retractor in a rear seat.

According to the present invention there is provided a retractor for a vehicle safety restraint for use in a rear vehicle seat, the retractor comprising:

seat belt webbing wound on a rotatable spool, and a vehicle sensor having an inertial sensor mass supported in a housing and movable relative thereto when vehicle acceleration or deceleration exceeds a predetermined magnitude, a vehicle sensor pawl arranged to be moved, in response to movement of the mass, from a position in which the spool is freely rotatable into a spool locking position, a seat back latching condition detector, adapted to be located in a latch for the rear seat back, means connecting the latching condition detector to the vehicle sensing pawl, the connecting means being operable to move the pawl into the spool locking position when a seat back de-latched condition is detected.

According to a preferred embodiment of the present invention the connecting means comprises a bowden cable which is moved, preferably pulled, when the latch is in a disengaged state. The bowden cable is connected to a piston in the retractor which is spring biased to a position in which it has no effect on the retractor. However when the seat back latch is disengaged, the bowden cable pulls the piston against the spring bias The piston operates a lever which rotates the vehicle sensor pawl into the spool locking position in which the spool is locked against belt webbing pay-out. Thus the retractor cannot be used by an occupant who is thus alerted to the insecure state of the seat back.

Once the seat back latch is properly engaged, the pull on the bowden cable is released and the piston in the retractor returns to the normal position. The retractor is free to pay-out, subject to inertial influence on the vehicle sensor— such as in a crash A retractor according to the invention is advantageous compared to known such retractors. Since the vehicle sensor pawl is used for locking the spool against belt webbing payout, a minimum number of extra components is reouired with attendant cost savings and increased reliability. In addition, in the safety locking condition, the retractor is fully and positively locked in a load bearing manner. The additional retractor locking devices used in known systems comprise much weaker, simple pawl engagement systems which are less reliable and are not capable of withstanding high loads.

For a better understanding of the present invention and to show how the same may be carried into effect, reference will now be made to the accompanying drawings in which.

Figure 1:
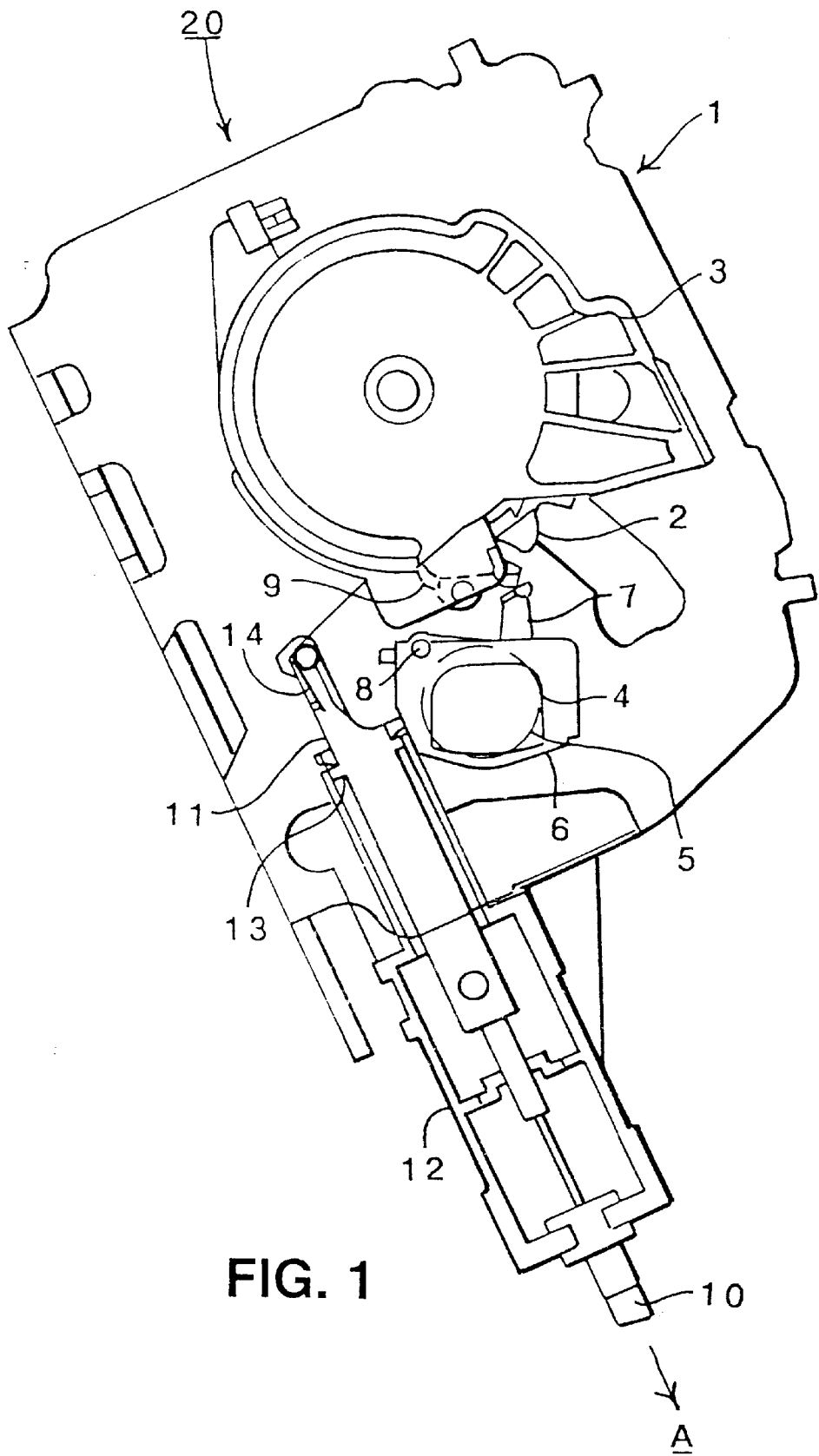
FIG. 1 is a -cross-sectional view of a retractor according to the present invention illustrating the condition with the seat properly latched and the vehicle sensor inactivated.

In the Figures a retractor 20 is shown in cross-section, and comprises a frame 1, a spool 2 on which belt webbing is wound, and a lock-cup 3 which engages and locks the spool against rotation under predetermined conditions.

A vehicle sensor 4 comprises a sensor ball 5 resting in a shallow cup 6. A sensor pawl 7 is hinged to the vehicle sensor housing at pivot point 8 and rests on top of the pawl 7. Movement of the ball 5 lifts the pawl 7 by rotation and pawl 7 in turn lifts a pilot arm 9 which locks the spool 2 with the lock-cup 3 preventing further rotation of the spool and pay-out of webbing.

A bowden cable 10 is connected to a seat latch (not shown). When the seat is fully latched the cable is in a protracted condition. When the seat is unlatched, the cable lo is pulled in direction A. The connection can be made in a variety of ways which will be evident to a person skilled in the art.

The cable 10 is attached to a piston 11 mounted in a piston housing 12. The piston il is biased by spring 13 to an upper position (as shown in FIG. 1). A leaf spring 14 is fixed to and bent over the top of the piston 11, with one arm extending in the direction of the vehicle sensor pawl 7.

FIG. 1 shows the condition when the seat back latch is properly engaged. The bowden cable 10 is in the protracted position, the piston 11 is in the upper position and leaf spring 14 is well clear of the vehicle sensor pawl 7. Thus the spool is free to rotate and the vehicle sensor will operate as normal if a crash is detected. In FIG. 1 the vehicle sensor ball 5 is shown sited centrally of the cup 6, as for a non-crash condition.

Figure 2:
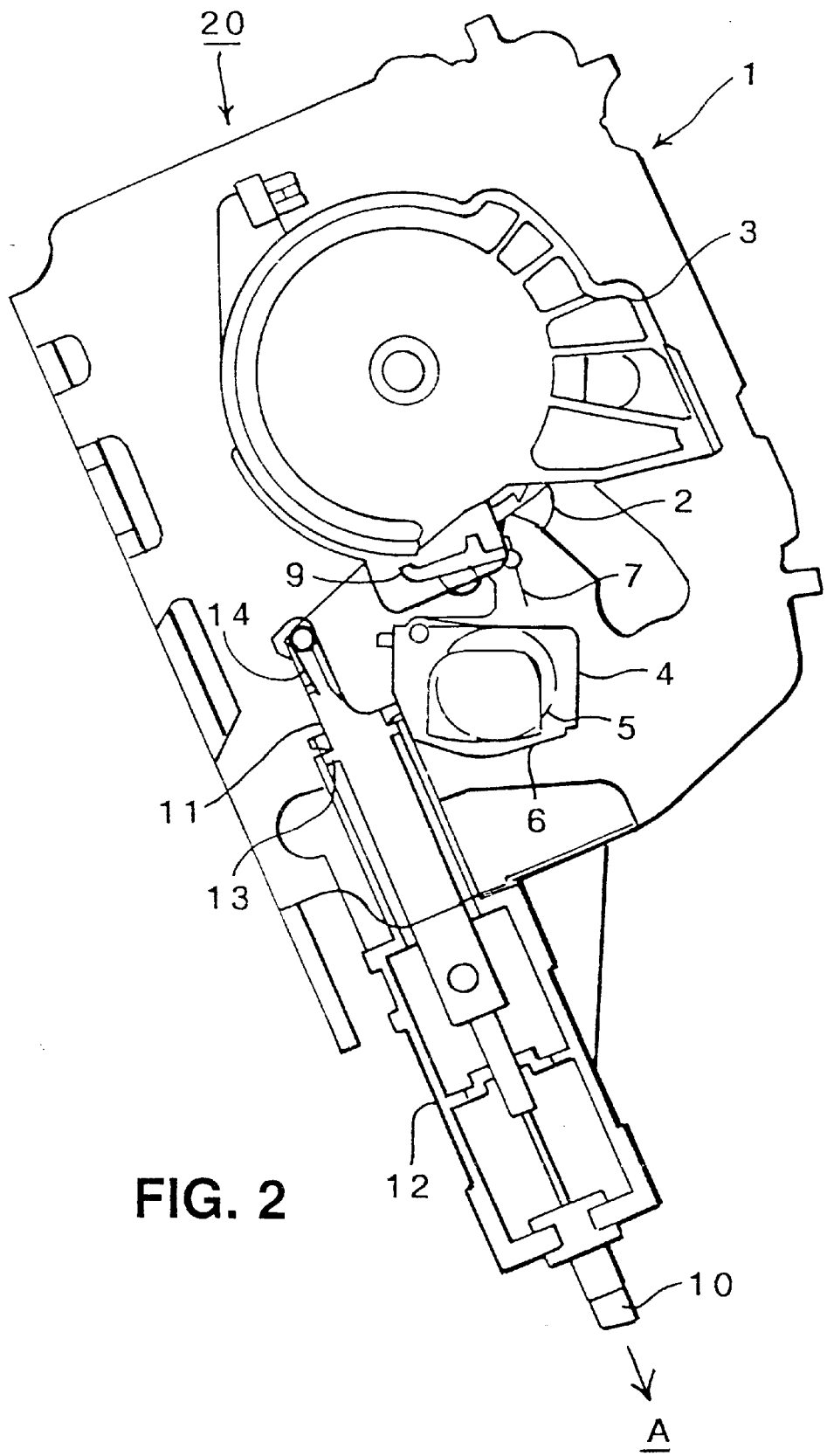
FIG. 2 is a cross-sectional view of the retractor of FIG. 1 with the seat properly latched and the vehicle sensor activated (crash condition)

FIG. 2 illustrates the condition when the seat back latch is properly latched but a crash condition has occurred. As in FIG. 1 the cable 10 is protracted, the piston 11 is in the upper position and the leaf spring 14 is clear of the vehicle sensor pawl 7. However the vehicle sensor ball 5 has been moved by crash induced inertia to an off-centre position. Thus the pawl 7 has rotated upwardly, lifting pilot arm 9 and engaging the lock-cup 3 with the spool 2. Thus the spool is locked against further belt webbing pay-out and the occupant is securely restrained.

Figure 3:
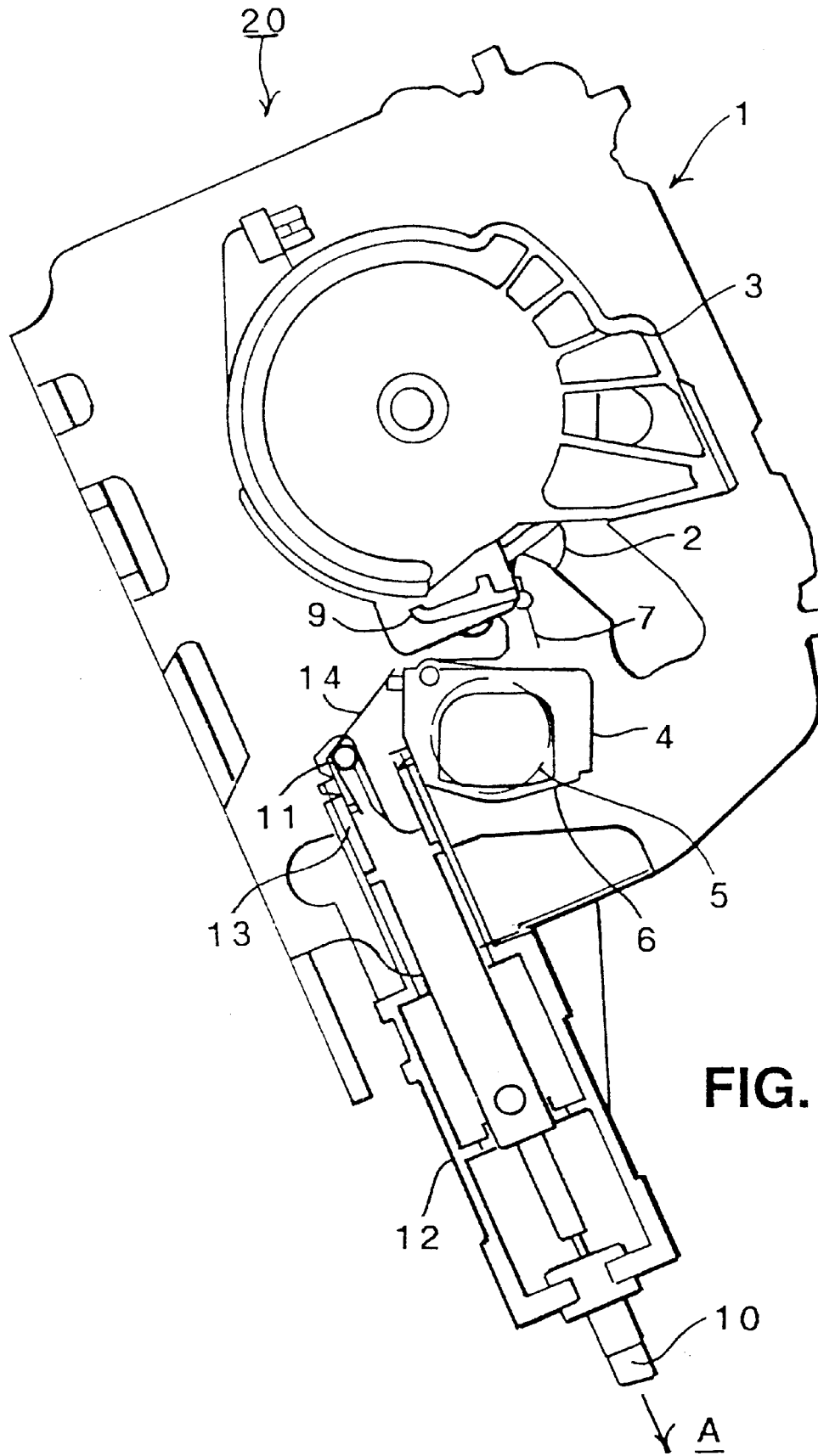
FIG. 3 is a cross-sectional view of the retractor of FIG. 1 with the seat not properly latched.

In FIG. 3, the seat back is not properly latched. The bowden cable 10 is retracted in the direction of arrow A and piston ll is pulled downwardly against the bias of spring 13. The outwardly extending arm of the leaf spring 14 contacts the rearwardly extending arm of the sensor pawl 7 and rotates the pawl 7 into engagement with pilot arm 9. Thus the lock-cup engages with the spool and the spool is locked against belt webbing pay-out. Thus the retractor cannot be used and the vehicle occupant is alerted to the insecure latching condition of the seat back. In this condition the vehicle sensor is inoperative.

The leaf spring 14 rotates the sensor yawl 7 during the first part of the stroke. Any further pull on the cable 10 and thus on piston 11 will be absorbed by deformation of the spring 14.

It will be understood by anyone skilled in the art that the arrangement could operate in the opposite manner, i.e. that the signal from the seat latch could influence the spool locking mechanism by a pushing motion rather than a pulling action.

Figure 4:
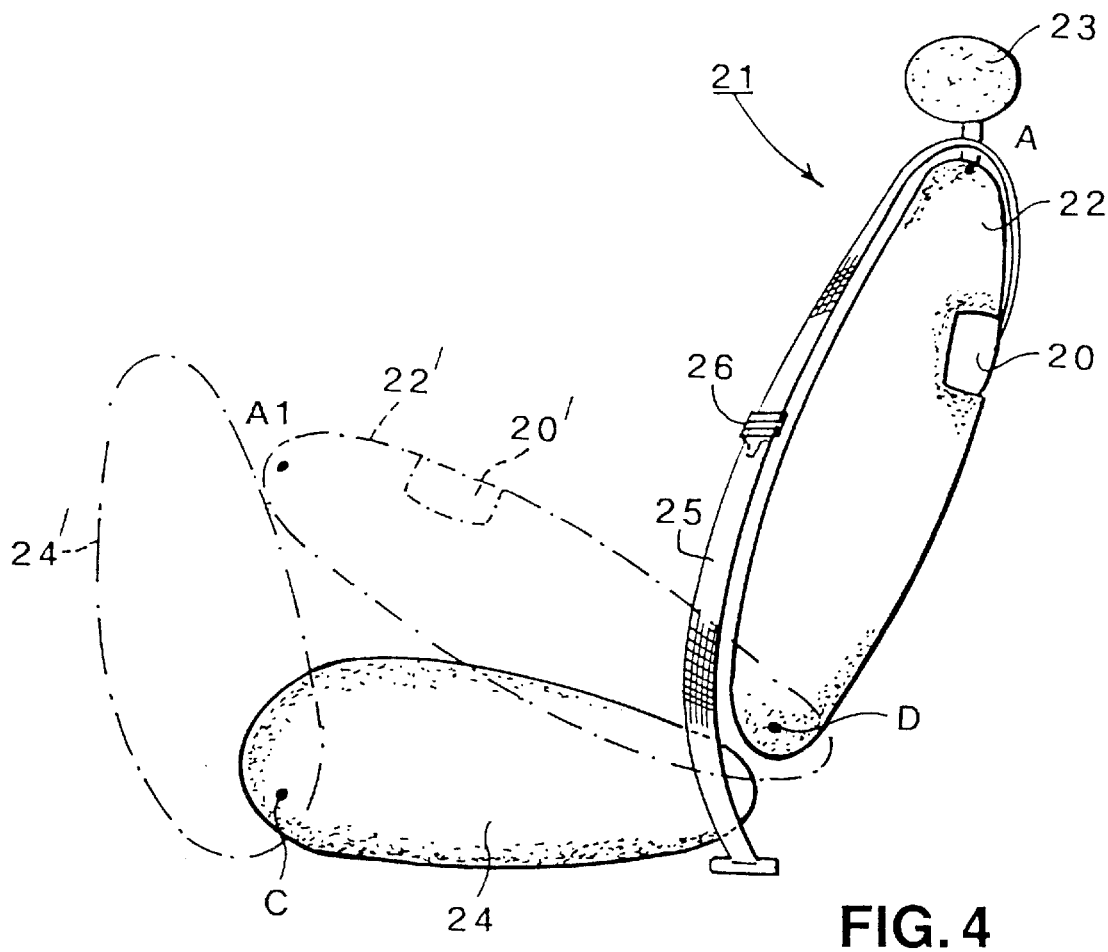
FIG. 4 is a schematic side view of a vehicle seat incorporating a retractor according to the present invention.

FIG. 4 schematically illustrates the vehicle seat incorporating the retractor 20 of FIGS. 1 to 3.

The vehicle seat 21 comprises a back 22 to which retractor 20 is fixed as shown. A head rest 23 is mounted to the top of the back 22. The back 22 pivots about point D into a variety of meeting and forward positions one of which is indicated by broken line 22' with the retractor still attached as shown at 20'.

A seat squab 24 pivots about point C into an upright position as shown by-broken line 24'.

Seat belt webbing 25 is arranged in the typical three point arrangement for safety restraints. One end of webbing 25 is fixed to the vehicle chassis at B, and the webbing passes up the front of the seat back 22 over the top, between the back 22 and the headrest 23, and is wound onto the retractor 20 other end is wound onto retractor 20.

A tongue 26 for fastening the belt in a buckle (not shown) is attached to the webbing 25.

When the seat back 22 is rotated to the lowered position (dotted lines 22') it can happen that the effective distance from the top A, A' of the seat to the fixing part B of the belt, is shortened. Thus AB is longer than A' B and the belt webbing 250 becomes loose and the extra is wound onto the retractor 20. In this case, the seat back 22 is prevented from being returned to its upright position by the shorter length of the free Felt webbing 25', since the retractor 20' is located against webbing payout.

Figure 5:
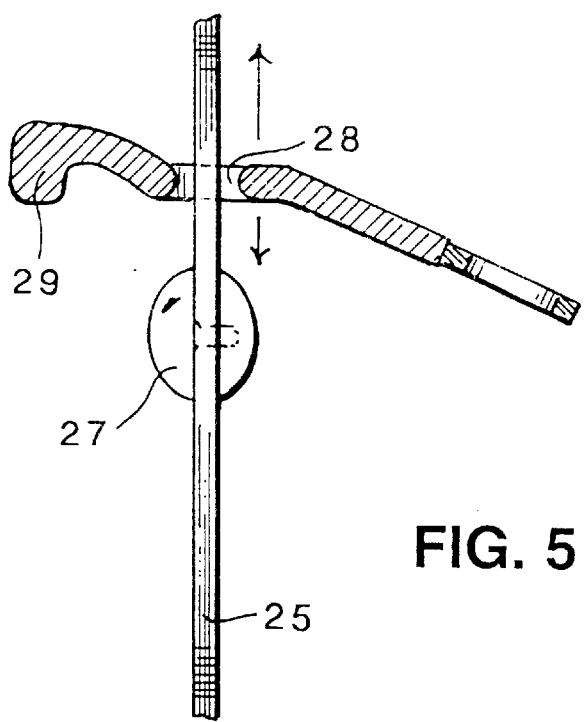
FIG. 5 is a side cross-sectional view of belt webbing forming part of FIG. 4.
Figure 6:
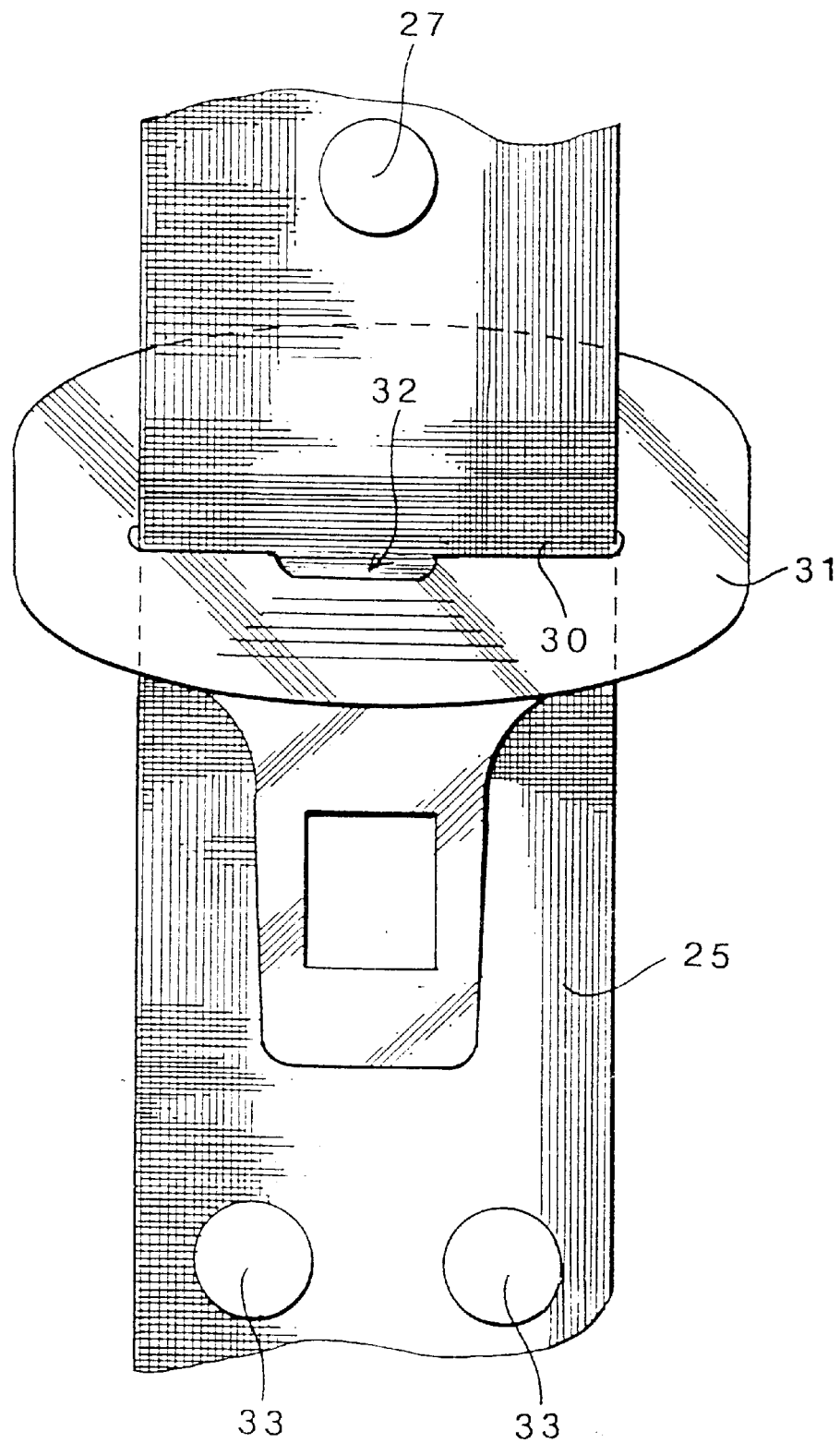
FIG. 6 is a front view of belt webbing forming part of FIG. 4.

This problem can be alleviated by the addition of a plastic moulded button 27, or the webbing as shown in FIGS. 5 and 6. This button 27 cooperates with a slot 28 in the webbing guide 29 on the retractor 20, to prevent take up of the belt beyond the level at which the belt is Presented to the occupant in normal use. Thus further retraction of the belt is impossible beyond this level and there will always be sufficient webbing to allow return of the seat back to an upright position.

FIG. 6 illustrates the webbing and button in more detail. The webbing 25 fits through a slot 30 on a tongue 31 so as to be freely slidable to achieve the optimum position on the webbing when fastened. This position of course depends on the geometry of the vehicle seat and the physical shape and size of the occupant. The tongue slot 30 thus has a wider central area 32 to allow the tongue to slide over button 27. FIG. 6 also shows two additional buttons 33 offset from the centre of the webbing. These buttons 33 stop the tongue falling down for example below the level of the seat squab, when the belt is not being worn.

What is claimed is:

1. A retractor for a vehicle safety restraint for use in a rear vehicle seat, the retractor comprising;

seat belt webbing wound on a rotatable spool, and a vehicle sensor having:

an inertial sensor mass supported in a housing and movable relative thereto when vehicle acceleration or deceleration exceeds a predetermined magnitude, a vehicle sensor pawl arranged to be moved, in response to movement of the mass, from a position in which the spool is freely rotatable into a spool locking position, a seat back latching condition detector, adapted to be located in a latch for the rear vehicle seat, means connecting the latching condition detector to the vehicle sensor pawl, the connecting means being operable to move the pawl into the spool locking position when a seat back de-latched condition is detected;

wherein the connecting means comprises a bowden cable connected to a piston in the retractor which is spring biased to a position in which it has no effect on the retractors but is arranged so that when the seat back latching condition detector detects a seat disengaged condition, then the bowden cable pulls the piston against the spring bias.

2. A retractor according to claim 1 comprising a lever operatively connecting the piston to the vehicle sensor pawl and operable to move it into the spool locking position in which the spool is locked against belt webbing pay-out.

* * * * *